H. F. STRATTON.
ELECTRIC CONTROLLER.
APPLICATION FILED APR. 6, 1911.
1,004,825.
Patented Oct. 3, 1911.
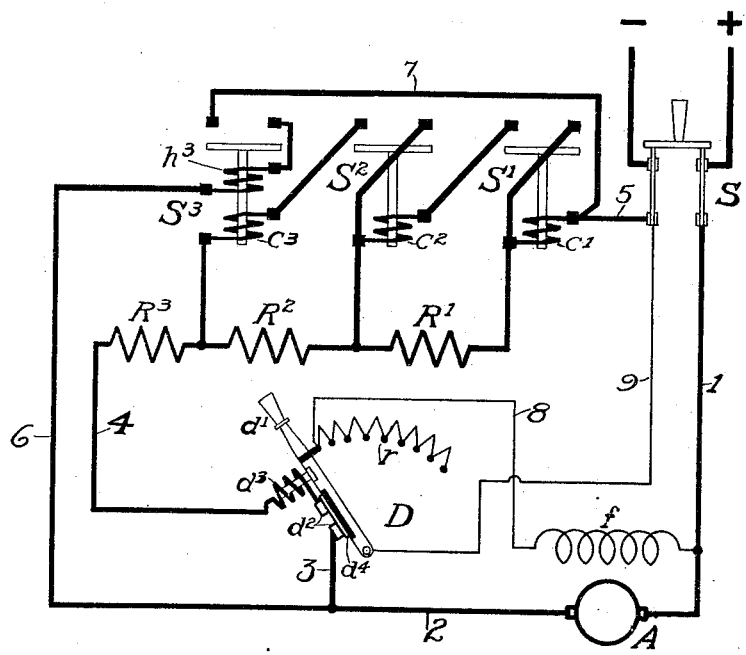
WITNESSES
INVENTOR
H. F. Stratton,
BY F. N. Barber
ATTORNEY

UNITED STATES PATENT OFFICE.

HARRY F. STRATTON, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

1,004,825.  Specification of Letters Patent.  Patented Oct. 3, 1911.

Application filed April 6, 1911. Serial No. 619,245.

*To all whom it may concern:*

Be it known that I, HARRY F. STRATTON, a citizen of the United States, residing at Cleveland, in the county of Cuyahoga and State of Ohio, have invented new and useful Improvements in Electric Controllers, of which the following is a specification.

My invention relates to improvements in electric controllers, particularly to those in which a rheostat or regulator is used to control the field of a motor.

During the starting of electric motors it is desirable that the field strength should be such that there will be little or no sparking of the brushes at the commutator, and when starting the motor under full load the field excitation should be as strong as possible to enable the motor to produce sufficient torque to start the load and to prevent serious sparking at the brushes.

The objects of my invention are—first, to provide a controller which will insure that the motor will be accelerated under full field excitation; and second, to maintain such excitation during the whole period of acceleration.

To further describe my invention I will refer to the accompanying drawing which shows a wiring diagram of a control system embodying my invention.

In this figure I show a knife switch S for connecting the motor and controller to a source of supply. The armature of the motor is represented by A; the shunt field by $f$; the starting resistance by $R'$, $R^2$, $R^3$, and the field regulator by D. The starting resistance is arranged to be short circuited or cut out of circuit by means of the automatic switches $S'$, $S^2$, $S^3$, having operating coils $c'$, $c^2$, $c^3$, which are arranged to be connected in series with the motor armature.

The types of switches preferred are those disclosed in Canfield's application, Serial Number 583,000, in which the switches have the peculiar characteristic that they remain in their open position when their coils are excited above a certain predetermined value, and operate to close their contacts when the current in said coils is below the said value.

The field regulator D has a contact arm $d'$ arranged to sweep over a series of contacts connected to the field resistance $r$, so that any desired amount of this resistance can be placed in the shunt field circuit for regulating the speed of the motor. The arm $d'$ is shown at the position of full excitation of the field when the switch S is closed. When the arm $d'$ is in the position shown, the contacts $d^2$ are closed by the bridging piece $d^4$ which is carried by and insulated from the arm, and the arm must be in this position in order that the circuit through the armature and the resistances $R'$, $R^2$, and $R^3$ may be closed upon closure of the switch S. A magnet $d^3$ receiving current through the contact $d^2$ and the said circuit is energized as long as the motor current continues to flow in this circuit, and prevents the arm being moved from this position as long as current flows therein. The closure of the last resistance switch $S^3$, however, short-circuits the wires 3 and 4, the contacts $d^2$, and the magnet $d^3$, so that after all of the starting resistance $R'$, $R^2$, $R^3$ has been cut out of the armature circuit and the motor is up to speed, the magnet $d^3$ is then deënergized, and the arm $d'$ can be moved to any desired position of the regulator, thereby giving to the motor any desired speed.

The operation of the controller is as follows: Assuming that the parts of the apparatus are in the positions shown on the drawing, and the knife switch S has just been closed, the shunt field is first excited through the following circuit: from the positive main through the wire 1, the field $f$, the wire 8, the arm $d'$ of the regulator, and the wire 9 to the negative main. A circuit is also established through the armature from the positive side of the line through the wire 1, the armature A, the wires 2 and 3, the contacts $d^2$ connected by the bridging piece $d^4$, the magnet $d^3$, the wire 4, the starting resistance $R^3$, $R^2$, $R'$, the operating coil $c'$ of the switch $S'$, and the wire 5 to the negative side of the line. The shunt field is excited with the maximum amount of current available therefor, and the current through the armature is limited by the starting resistance, the magnet $d^3$ holding the arm of the regulator in the position shown. The first rush of current in the winding $c'$ of the switch $S'$ will cause the switch to remain open until the motor current has decreased due to a rise in speed of the motor until a predetermined value is reached, at which time the switch S' will close. This will short circuit the resistance R' and excite the operating winding $c^2$ of the switch $S^2$, retaining the winding $c'$ also in circuit. The increase of current due to the short circuiting of the resistance R' will cause the switch $S^2$ to remain open until the armature has again increased in speed, thereby cutting down the current therein and in the winding $c^2$ to the point at which the switch $S^2$ is adjusted to operate, when this switch will close. This will short circuit the resistance $R^2$ and connect in circuit the winding $c^3$ of the switch $S^3$, still retaining in circuit the windings $c^2$ and $c'$. The increase of current caused thereby will cause the switch $S^3$ to remain open until the motor current has again decreased to the proper amount, at which time this switch will operate and close its contacts. When this occurs the motor current is from the positive main through the wire 1, the armature A, the wires 2 and 6, the winding $h^3$ on the switch $S^3$ which holds the switch closed, the contacts of the switch $S^3$, and the wires 7 and 5 to the negative main. Motor current no longer flows through the wires 3 and 4, the contacts $d^2$, the magnet $d^3$, nor the operating windings $c'$, $c^2$, $c^3$. The switches S', $S^2$, therefore, drop open and the motor quickly attains the speed due to its full field excitation. Since the magnet $d^3$ is now deenergized the arm $d'$ can be moved to any point to include the desired amount of resistance in the shunt field, thereby increasing the speed of the motor to the desired amount. To stop the motor the switch S is opened, whereupon the armature and field are disconnected from the source of supply and the armature quickly comes to rest. Before the motor can be restarted, however, it is necessary to move the arm $d'$ of the regulator back to the position shown in order to close the contacts $d^2$, whereupon, when the switch S is closed, the magnet $d^3$ will again become energized and hold the arm $d'$ in the position of full field excitation until all of the starting resistance in the armature circuit has been cut out by the controlling switches S', $S^2$, $S^3$.

I have shown my invention used in connection with switches operated by the motor current, but it will be readily understood that it can be used with any form of switch or controller for starting a motor. Neither do I limit myself to the exact form of construction of the regulator D which is indicated in the drawing, nor to any definite manner of locking the same in the position shown.

I claim—

1. In a motor control system, a motor, a circuit therefor containing a resistance, one or more switches for controlling said resistance, a field regulator for the motor, contacts in the motor circuit closed only when said regulator is in a certain position, and means for shunting said contacts when a certain number of said switches are closed.

2. In a motor control system, a motor, a circuit therefor containing a resistance, one or more switches for controlling said resistance, a field regulator for the motor, contacts in the motor circuit closed only when said regulator is in a certain position, a magnet energized by the current through said contacts to hold the regulator in said position, and means for shunting said contacts when a certain number of said switches are closed.

3. In a motor controller, a motor, a field regulator therefor, contacts in the armature circuit closed when said regulator is in a certain position, means energized by the current through said contacts for holding said regulator in said position, and means for starting said motor, said means having a switch for shunting said contacts and said magnet.

4. In an electric controller, a circuit, a rheostat for said circuit, a second circuit, a regulator therefor, and contacts in the first circuit closed in a certain position of said regulator carrying current only when said rheostat is connected in said circuit.

5. In an electric controller, a circuit, a rheostat for said circuit, a second circuit, a regulator therefor, and contacts in the first circuit closed in a certain position of said regulator and only when said rheostat is connected in said circuit, and a magnet for holding said regulator in a position to close said contacts while current is flowing through said contacts.

6. In a motor control system, a motor, a starting resistance therefor, one or more switches for cutting out said resistance step by step, a field rheostat for said motor, means for causing said field rheostat to be in a position of full field excitation during the time of cutting out of the starting resistance, and means for holding said rheostat in said position, until all of said starting resistance is cut out.

7. In a motor controller, a motor, a field regulator therefor, contacts closed in a certain position of the regulator, a magnet for holding the regulator in said position, means connecting the motor to a source of supply in a circuit including said magnet, said contacts and a resistance, and means shunting said resistance and said magnet and contacts.

8. In a motor controller, a motor, a field regulator therefor, a circuit including a magnet for holding said regulator in a certain position, means connecting the motor armature in the said circuit and to a source of supply, a set of contacts closed when the regulator is in said position, a resistance, one or more switches adapted to close in a predetermined order to cut out said resistance, and means for deënergizing the said magnet when all the resistance is cut out so that the regulator can be moved to regulate said motor field.

Signed at Cleveland, Ohio, this 3rd day of April, A. D. 1911.

HARRY F. STRATTON.

Witnesses:
J. H. HALL,
H. M. DIEMER.

Copies of this patent may be obtained for five cents each, by addressing the "Commissioner of Patents, Washington, D. C."